United States Patent
Levasseur

(10) Patent No.: US 9,689,721 B2
(45) Date of Patent: Jun. 27, 2017

(54) INDICATOR DEVICE, NOTABLY FOR MOTOR VEHICLES

(71) Applicant: Johnson Controls Automotive Electronics SAS, Cergy Pontoise (FR)

(72) Inventor: Francois Levasseur, Conflans Sainte Honorine (FR)

(73) Assignee: Johnson Controls Automotive Electronics SAS, Cergy Pontoise (FR)

( * ) Notice: Subject to any disclaimer, the term of this patent is extended or adjusted under 35 U.S.C. 154(b) by 145 days.

(21) Appl. No.: 14/601,045

(22) Filed: Jan. 20, 2015

(65) Prior Publication Data

US 2015/0204700 A1    Jul. 23, 2015

(30) Foreign Application Priority Data

Jan. 21, 2014 (FR) ...................... 14 00111

(51) Int. Cl.
*G01D 13/22* (2006.01)
*G01D 13/02* (2006.01)

(52) U.S. Cl.
CPC ............. *G01D 13/22* (2013.01); *G01D 13/02* (2013.01)

(58) Field of Classification Search
CPC ................................ G01D 13/26; G01D 13/22
USPC .................................................. 116/216, 284
See application file for complete search history.

(56) References Cited

U.S. PATENT DOCUMENTS

| | | | | |
|---|---|---|---|---|
| 5,708,462 A | * | 1/1998 | Helmbold et al. | B41J 11/46 346/136 |
| 5,841,359 A | * | 11/1998 | Grilk | B60R 16/0232 340/438 |
| 5,847,531 A | * | 12/1998 | Hoffsommer et al. | G01D 11/14 116/297 |
| 6,861,817 B2 | * | 3/2005 | Pigott et al. | H02P 8/08 318/560 |
| 7,034,496 B2 | * | 4/2006 | Oishi | H02P 8/34 116/284 |
| 8,080,968 B2 | * | 12/2011 | Katagiri | G01R 7/06 318/400.42 |
| 8,102,139 B2 | * | 1/2012 | Nakane | G01D 5/2451 318/463 |
| 8,513,910 B2 | * | 8/2013 | Yamada | G01D 11/16 318/685 |

(Continued)

OTHER PUBLICATIONS

French Search Report and Written Opinion in priority application No. 14/00111 dated Oct. 17, 2014, 7 pages.

*Primary Examiner* — R. A. Smith

(74) *Attorney, Agent, or Firm* — Foley & Lardner LLP

(57) ABSTRACT

An indicator device for motor vehicles includes a dial, an indicator unit with needle, and a motor device. The indicator device with needle is capable of being rotationally driven around an axis of rotation of the indicator device. The indicator unit with needle is designed to be rotationally driven by a torque generated by the motor device. The indicator device is capable of being operated with a motor device of a first type and with a motor device of a second type. The indicator device includes minimum time information matched with the motor device of the first type and with the motor device of the second type such that the position of the indicator unit with needle is identical for cases where the motor device of the first type or the motor device of the second type is used, and for different preceding displacements of the indicator unit with needle.

3 Claims, 1 Drawing Sheet

(56) References Cited

U.S. PATENT DOCUMENTS

2007/0030160 A1    2/2007  Wang
2012/0055241 A1    3/2012  Katoh
2012/0247385 A1  10/2012  Cook
2013/0187582 A1*  7/2013  Nishimura et al. ....... H02P 6/10
                                                                  318/400.14

* cited by examiner

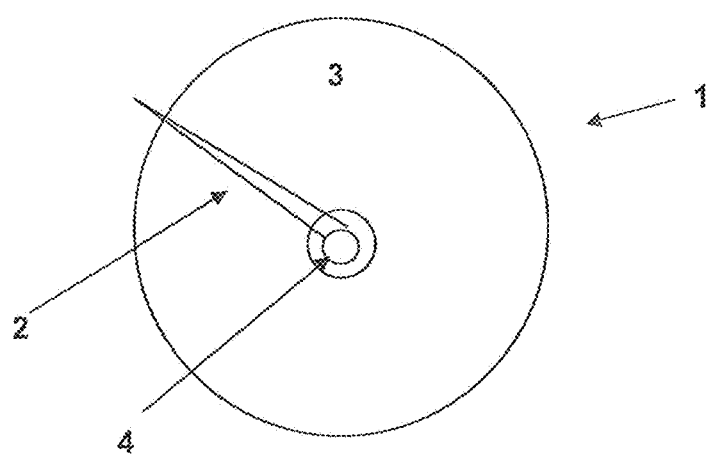

INDICATOR DEVICE, NOTABLY FOR MOTOR VEHICLES

CROSS REFERENCE TO RELATED APPLICATIONS

The present application is a U.S. Utility application which claims the benefit of French Patent Application No. 14/00111 filed on Jan. 21, 2014, the entire disclosure of which is incorporated herein by reference.

This invention relates to an indicator device, notably on board of motor vehicles, for displaying the speed or engine speed of the vehicle or another parameter.

The dashboard of a motor vehicle generally includes an instrument panel, situated facing the driver, which includes a set of indicators, notably a speedometer or a revolution counter, or an indicator of other parameters of the vehicle, these indicators being able to have needles.

The indicator unit with needle of the indicator device, notably controlled and driven rotationally by an electric motor or another motor element, generally extends in front of a screen printed support, bearing indicating characters (graduations and/or values, notably speed values), typically forming the dial.

The use of different types of motor elements generally causes differences with regard to the performance of the system common to the motor element and the indicator unit with needle.

Such an indicator is not capable of ensuring that the same positions of the indicator unit with needle are reached (that is to say, identical positions of the indicator unit with needle)
when different types of motor elements are used
and following displacements of the indicator unit with needle, notably comparatively rapid displacements, that is to say movements, of the indicator unit with needle.

The aim of this invention is notably to remedy the disadvantages of the prior art, and notably those mentioned above, and its aim is also to propose an indicator device that can guarantee identical positions of the indicator unit with needle, even when different types of motor elements, notably stepping motors, are used in the indicator device.

According to this invention, this aim is achieved by an indicator device, notably for motor vehicles, incorporating a dial, an indicator unit with needle, and a motor device, the indicator device with needle being capable of being rotationally driven around an axis of rotation of the indicator device, the indicator unit with needle being designed to be rotationally driven by a torque generated by the motor device, characterised in that
the indicator device is capable of being operated with a motor device of a first type,
the indicator device is capable of being operated with a motor device of a second type,
and in that the indicator device includes minimum time information matched with the motor device of the first type and with the motor device of the second type such that the position of the indicator unit with needle is identical for cases where the motor device of the first type or the motor device of the second type is used, and for different preceding displacements of the indicator unit with needle.

It is therefore advantageously possible to allow the assembly of indicator devices according to this invention using different motor devices, that is to say, not only a motor device of the first type, but also a motor device of a second type.

Typically, the indicator device incorporates a dial, an indicator unit with needle, and a motor device, preferably a stepping motor. The indicator unit with needle is normally driven—by the motor device—rotationally around an axis of rotation of the indicator device.

According to this invention, different types of motor elements can be used for an indicator device: the indicator device can be operated with a motor device of a first type, or with a motor device of a second type, that is to say, when assembling the indicator device, either the motor device of the first type or the motor device of the second type is used for the assembly.

This choice should not have an impact on the functionality of the indicator device. Even if, in the context of this invention, a motor device of a first type and a motor device of a second type are mentioned, it must be understood that more than two different types of different motor devices can be used.

Different types of motor device typically have different properties, notably characteristics relating to the maximum torque that can be sustained (for example: without losing or adding steps for stepping motors) or the maximum speed that can be reached (also without losing or adding steps). When, following an operation of the indicator device, different positions (of rotation of the indicator unit with needle) are reached successively, such differences of properties (of different types of motor device) can lead to situations where such indicator devices display different values (that is to say, the indicator unit with needle of the indicator device with the motor device of the first type displays a different value from the indicator device with the motor device of the second type).

According to this invention, such differences are avoided thanks to minimum time information.

The minimum time information is recorded, for example, in a control module of the indicator device, in such a way that
a maximum limit torque and/or
a maximum limit speed
relating to the movement of the indicator unit with needle is/are not exceeded. It is therefore possible to respect the properties of all the different types of motor device, and consequently, it is possible to assemble the indicator device with any possible type of motor device (among a set of types of motor device that are permitted).

Hence, by the fact that the indicator device includes the minimum time information matched with the motor device of the first type and with the motor device of the second type, the position of the indicator unit with needle is identical for cases where the motor device of the first type or the motor device of the second type is used, and for different preceding displacements of the indicator unit with needle (that is to say for different past displacements of the indicator unit with needle). Furthermore, by preference, not only the position of the indicator unit with needle is identical for cases where the motor device of the first type or the motor device of the second type is used, and for different preceding displacements, but also the movement of the indicator unit with needle will be synchronous for cases where the motor device of the first type or the motor device of the second type is used. The algorithm according to this invention is adapted to all the angles of displacement of the indicator unit with needle, that is to say that all the indicator units with needle (which are part of different indicator devices having different types of motor device) will reach not only the same position but are driven in a synchronous manner (that is to say all reaching their objectives (positions) at the same time, and this even though all the motor devices are different).

According to a particularly preferred embodiment of the indicator device according to this invention, the indicator unit with needle is positioned, at least in part, in front of the dial relative to a normal viewing direction of a user of the indicator device.

By virtue of such an embodiment of the indicator device, it is advantageously possible to apply this invention to indicator devices having an indicator unit with needle in front of the dial, that is to say, visible to a user of the motor vehicle.

According to another preferred embodiment of the indicator device according to this invention, the indicator unit with needle is positioned, at least in part, behind the dial relative to a normal viewing direction of a user of the indicator device.

By virtue of such an embodiment of the indicator device, it is advantageously possible to apply this invention to indicator devices having an indicator unit with needle behind the dial, that is to say where the indicator unit with needle is (at least in part) not visible to a user of the motor vehicle relative to a normal viewing direction of a user of the indicator device.

According to yet another preferred embodiment of the indicator device according to this invention, the minimum time information matched with the motor device of the first type, and with the motor device of the second type, corresponds to a minimum time for performing the displacement of the indicator device with needle from a first rotational position around the axis of rotation to a second rotational position around the axis of rotation.

By virtue of such an embodiment of the indicator device, it is advantageously possible to design a more suitable system for the operation of the indicator device, since the application of the minimum time information is restricted for displacements of the indicator unit with needle from a first rotational position around the axis of rotation to a second rotational position around the axis of rotation.

According to yet another preferred embodiment of the indicator device according to this invention, the indicator device includes further minimum time information matched with the motor device of the first type and with the motor device of the second type, such that the position of the indicator unit with needle is identical for cases where the motor device of the first type or the motor device of the second type is used, and for different preceding displacements of the indicator unit with needle, and such that the further minimum time information matched with the motor device of the first type, and with the motor device of the second type, corresponds to a minimum time for performing the displacement of the indicator unit with needle from a third rotational position around the axis of rotation to a fourth rotational position around the axis of rotation.

By virtue of such an embodiment of the indicator device, it is advantageously possible to design a more suitable system for the operation of the indicator device, since the application of the minimum time information is restricted for displacements of the indicator unit with needle from a third rotational position around the axis of rotation to a fourth rotational position around the axis of rotation.

Other characteristics and advantages of the invention will emerge from reading the description that follows of a particular, non-limitative embodiment of the invention.

BRIEF DESCRIPTION OF THE DRAWINGS

Reference will be made to the attached drawings, among which:

FIG. 1 is a diagrammatic front view of an indicator device including a needle according to an embodiment of this invention, the indicator device being in a first operating mode.

DESCRIPTION OF THE DRAWINGS

FIG. 1 is a diagrammatic front view of the indicator device 1. The indicator device 1 includes the dial 3, the needle 2 and a motor device 4.

The motor device is notably a stepping motor device 4.

Typically, the indicator device 1 includes a control module for the motor device 4. This control module (or command module for the motor device 4) is linked with the motor device 4, typically by means of electrically conductive connectors.

The control module (or command module) sends signals to the motor device 4 such that the position of the indicator unit with needle (driven by the motor device 4) is repeatable, even when different types of motor devices are used.

According to this invention, it is planned that different types of motor elements can be used for the same type of indicator device: the indicator device can be operated either with a motor device of a first type, or with a motor device of a second type, typically when assembling the indicator device. However, this choice should not have an impact on the functionality of the indicator device.

Different types of motor device typically have different properties, notably characteristics relating to the maximum torque that can be sustained (for example: without losing or adding steps for stepping motors) or the maximum speed that can be reached (also without losing or adding steps). When, following an operation of the indicator device, different positions (of rotation of the indicator unit with needle) are reached successively, such differences of properties (of different types of motor device) can lead to situations where such indicator devices display different values (that is to say, the indicator unit with needle of the indicator device with the motor device of the first type displays a different value from the indicator device with the motor device of the second type).

According to this invention, such differences are avoided thanks to minimum time information that corresponds to a minimum time, typically of displacement of the indicator unit with needle between two positions. The minimum time information translates into a maximum speed (and/or a maximum change of speed, that is to say, an acceleration or deceleration (with a minimum absolute value)) of the movement of the indicator unit with needle.

The minimum time information is, for example, recorded in a control module of the indicator device, in such a way that a maximum limit torque and/or a maximum limit speed relating to the movement of the indicator unit with needle is/are not exceeded.

It is therefore advantageously possible to respect the properties of all the different types of motor device, and consequently, it is possible to assemble the indicator device with any possible type of motor device (among a set of types of motor device that are permitted).

The invention claimed is:

1. An indicator device for motor vehicles, comprising:
   a dial;
   an indicator unit with needle; and
   a motor device, the indicator device with needle being capable of being rotationally driven around an axis of rotation of the indicator device, the indicator unit with needle being designed to be rotationally driven by a torque generated by the motor device wherein the indicator device is capable of being operated with a motor device of a first type, the indicator device is capable of being operated with a motor device of a second type, the indicator device includes minimum time information matched with the motor device of the first type and with the motor device of the second type such that the position of the indicator unit with needle is identical for cases where the motor device of the first type or the motor device of the second type is used, and for different preceding displacements of the indicator unit with needle, the minimum time information matched with the motor device of the first type, and with the motor device of the second type, corresponds to a minimum time for performing the displacement of the indicator unit with needle from a first rotational position around the axis of rotation to a second rotational position around the axis of rotation, and the indicator device includes further minimum time information matched with the motor device of the first type and with the motor device of the second type, such that the position of the indicator unit with needle is identical for cases where the motor device of the first type or the motor device of the second type is used, and for different preceding displacements of the indicator unit with needle, and such that the further minimum time information matched with the motor device of the first type, and with the motor device of the second type, corresponds to a minimum time for performing the displacement of the indicator unit with needle from a third rotational position around the axis of rotation to a fourth rotational position around the axis of rotation.

2. An indicator device as claimed in claim 1, wherein the indicator unit with needle is positioned, at least in part, in front of the dial relative to a normal viewing direction of a user of the indicator device.

3. An indicator device as claimed in claim 1, wherein the indicator unit with needle is positioned, at least in part, behind the dial relative to a normal viewing direction of a user of the indicator device.

* * * * *